United States Patent
Krauss (10) Patent No.: US 9,274,946 B2
(45) Date of Patent: Mar. 1, 2016

(54) PRE-LEAK DETECTION SCAN TO IDENTIFY NON-POINTER DATA TO BE EXCLUDED FROM A LEAK DETECTION SCAN

(75) Inventor: Kirk J. Krauss, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1525 days.

(21) Appl. No.: 12/649,832

(22) Filed: Dec. 30, 2009

(65) Prior Publication Data

US 2011/0161614 A1    Jun. 30, 2011

(51) Int. Cl.
*G06F 12/02* (2006.01)
*G06F 7/02* (2006.01)

(52) U.S. Cl.
CPC ...... *G06F 12/0253* (2013.01); *G06F 2212/702* (2013.01)

(58) Field of Classification Search
None
See application file for complete search history.

(56) References Cited

U.S. PATENT DOCUMENTS 5,644,709 A * 7/1997 Austin .......................... 714/53
8,566,797 B2 * 10/2013 Pedersen ..................... 717/128
2005/0235127 A1 * 10/2005 Muthiah et al. ............. 711/170
2008/0301646 A1 * 12/2008 Gupta .......................... 717/127
2010/0254615 A1 * 10/2010 Kantor et al. ................ 382/218

OTHER PUBLICATIONS

Hirzel, Martin, Amer Diwan, and Antony Hosking. "On the usefulness of liveness for garbage collection and leak detection." ECOOP 2001—Object-Oriented Programming. Springer Berlin Heidelberg, 2001. 181-206.*

* cited by examiner

*Primary Examiner* — Yaima Rigol
(74) *Attorney, Agent, or Firm* — Cuenot, Forsythe & Kim, LLC (57) ABSTRACT

A computer-implemented method of detecting memory that may be reclaimed from application data objects that are no longer in use. When at least a first virtual memory region is newly committed for heap block storage, a pre-leak detection scan of other virtual memory regions can be performed to identify at least one non-pointer data item in the other virtual memory regions, the non-pointer data item comprising data that corresponds to an address of a memory location within the first virtual memory region, but that is not a memory pointer. A leak detection scan can be performed to identify potential memory pointers, wherein the identified non-pointer data item is excluded from the identified potential memory pointers. A list of leaked heap blocks can be output. Each leaked heap block can exclusively comprise memory locations that do not have a corresponding potential memory pointer.

20 Claims, 4 Drawing Sheets

PRE-LEAK DETECTION SCAN TO IDENTIFY NON-POINTER DATA TO BE EXCLUDED FROM A LEAK DETECTION SCAN

BACKGROUND

The embodiments disclosed within this specification relate to runtime analysis of application program code. More particularly, the embodiments relate to detecting memory leaks in an application.

A memory leak is a particular type of memory consumption by an application where the application is unable to appropriately release system memory it has acquired. A memory leak can diminish the performance of the system on which the application is instantiated by reducing the amount of available memory. If too much of the allocated memory remains un-released, the amount of available memory will be excessively depleted, and all or part of the system typically will cease to function properly. For example, the application may fail or the system may slow down unacceptably due to thrashing, which is a degenerate situation on the system where increasing resources are used to do a decreasing amount of work. A software application that leaks memory excessively can run out of available virtual memory and can, as a result, cease to function, which is commonly known as a crash.

Techniques such as garbage collection are sometimes used in an attempt to reclaim memory from application data objects that are no longer in use. Garbage collection works effectively only in certain environments such those that are available for Java and managed code. Garbage collection is not very efficacious for native code (ie. C/C++) programs. The difference is that Java/managed code treats all object references dynamically such that the objects are relocatable when a garbage collection occurs. The garbage collector recognizes all references as such, and can clean up any objects whose reference count has dropped to zero. Native code programs use actual data pointers that do not change while the program is running; the objects referenced by these static pointers are not reference counted and thus can be leaked if the situation arises where no pointers reference them.

BRIEF SUMMARY OF THE INVENTION

The embodiments disclosed within this specification relate to detecting memory that may be reclaimed from application data objects that are no longer in use. When at least a first virtual memory region is newly committed for heap block storage, a pre-leak detection scan of other virtual memory regions can be performed to identify at least one non-pointer data item in the other virtual memory regions, the non-pointer data item comprising data that corresponds to an address of a memory location within the first virtual memory region, but that is not a memory pointer. A leak detection scan can be performed to identify potential memory pointers, wherein the identified non-pointer data item is excluded from the identified potential memory pointers. A list of leaked heap blocks can be output. Each leaked heap block can exclusively comprise memory locations that do not have a corresponding potential memory pointer.

Another embodiment of the present invention also can include method of reclaiming memory from application data objects that are no longer in use. Allocation of a heap block triggering a first virtual memory region to be newly committed for heap block storage can be detected. A pre-leak detection scan of other virtual memory regions can be performed to identify at least one non-pointer data item in the other virtual memory regions, the non-pointer data item comprising data that corresponds to an address of a memory location within the first virtual memory region, but that is not a memory pointer. A leak detection scan can be performed. The leak detection scan can include determining whether the non-pointer data has changed since the first virtual memory region was committed and identifying potential memory pointers, wherein the identified non-pointer data item is excluded from the identified potential memory pointers when the non-pointer data has changed since the first virtual memory region was committed. The method also can include outputting a list of leaked heap blocks, each leaked heap block exclusively comprising memory locations that do not have a corresponding potential memory pointer.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to a method and a system which improves the efficacy of reclaiming memory from application data objects that are no longer in use. In illustration, by coincidence, some data within virtual memory locations may have values that correlate to other locations within virtual memory, and thus may be mistakenly interpreted as being pointers to those virtual memory locations, even though the data are never treated as pointers. For example, a hexadecimal data item representing the text "hello" may contain the hexadecimal values 68 65 6c 6c 6f. These hexadecimal values may correlate to an actual address of a memory location in a heap block, namely 0x68656c6c6f. So, even though that hexadecimal data represents text, during a conventional leak scan the hexadecimal values may be misinterpreted as being a memory pointer to the memory location 0x68656c6c6f in an allocated heap block. Accordingly, the leak scan will usually interpret the hexadecimal data as indicating that the memory location 0x68656c6c6f is still being used by the CPUT, although it may not be, and result in an undetected memory leak.

In accordance with the present invention, when a requested heap memory allocation causes virtual memory to be committed, a pre-leak detection scan can be performed to identify within other writable virtual memory regions data that could be mistakenly interpreted as being memory pointers to memory locations within the newly committed virtual memory region, but are not. This data can be identified as non-pointers and tracked. For instance, the locations of the non-pointers within virtual memory can be associated with the memory locations to which the data could potentially be misinterpreted as pointing, or associated with the heap memory region itself, and such associations can be maintained in a suitable non-pointer tracking structure. The identification of the non-pointers can be performed before the existence of any new heap blocks allocated in a newly committed virtual memory region has been made known to the application that has requested the allocation of the heap blocks.

When a leak scan in accordance with the present invention is later performed and the virtual memory regions are searched to identify potential pointers, the virtual memory locations that were tracked when the virtual memory region was committed for heap block storage can be identified. If the data in those virtual memory locations has not changed since the virtual memory region was committed, the data contained in the tracked virtual memory locations can be considered non-pointers and ignored by the leak scanner as it determines whether allocated heap memory is referenced by any pointers. Thus, when a virtual memory location contains data that otherwise would be mistaken as pointing to allocated memory, the data contained in that virtual memory location can be treated as non-pointer data when a leak scan is performed. Since that data is not a real memory pointer, ignoring that data during the leak scan improves the accuracy of the leak scan by preventing false negatives among the leak scan results.

Figure 1:
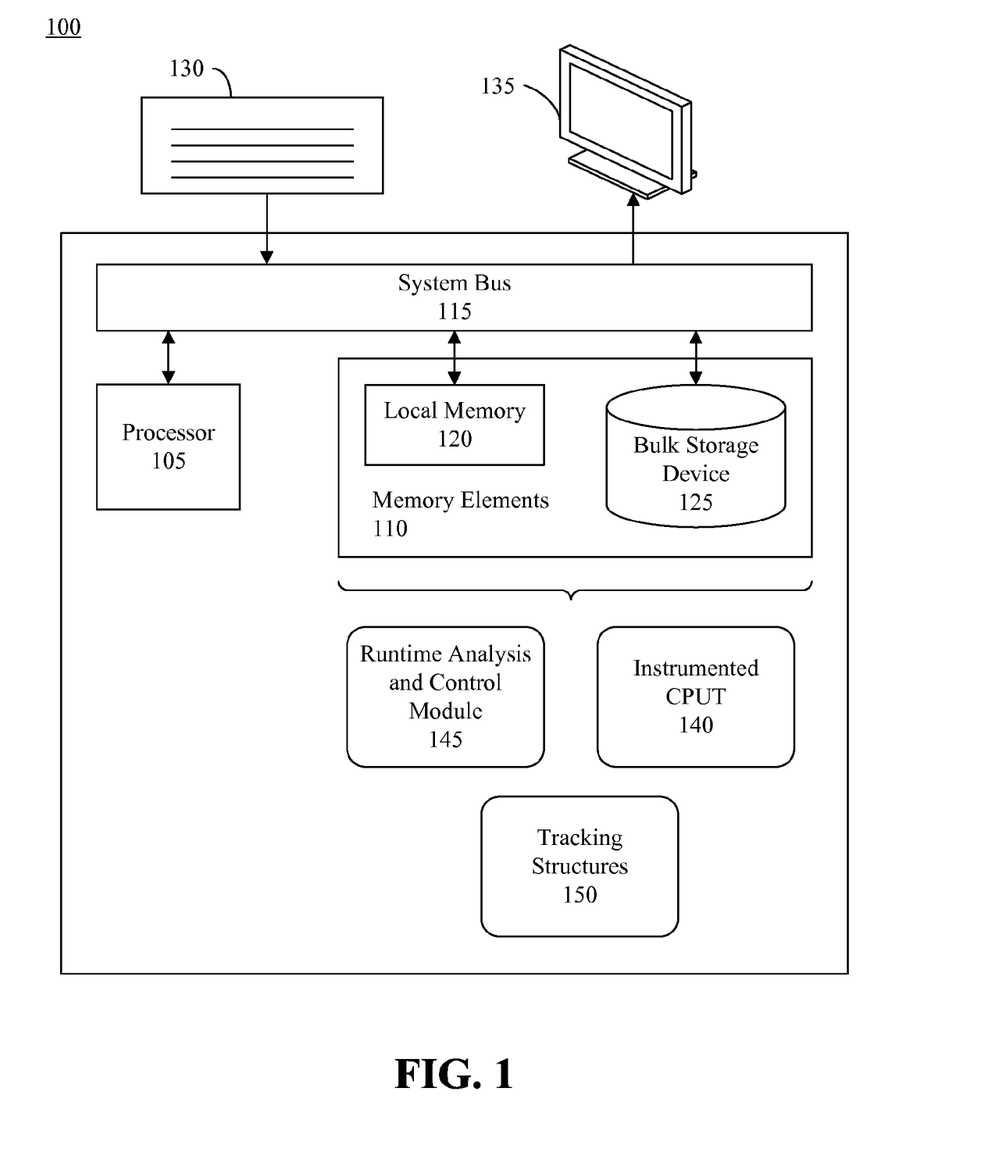
FIG. 1 is a block diagram illustrating a system that implements memory leak detection in accordance with an embodiment of the present invention.

FIG. 1 is a first block diagram illustrating a system 100 that implements memory leak detection in accordance with one embodiment of the present invention. The system 100 can include at least one processor 105 coupled to memory elements 110 through a system bus 115. As such, the system 100 can store program code within the memory elements 110. The processor 105 can execute the program code accessed from the memory elements 110 via system bus 115. In one aspect, for example, the system 100 can be implemented as computer that is suitable for storing and/or executing program code. It should be appreciated, however, that the system 100 can be implemented in the form of any system comprising a processor and memory that is capable of performing the functions described within this specification.

The memory elements 110 can include one or more physical memory devices such as, for example, local memory 120 and one or more bulk storage devices 125. Local memory 120 refers to random access memory or other non-persistent memory device(s) generally used during actual execution of the program code. The bulk storage device(s) 125 can be implemented as a hard drive or other persistent data storage device. The system 100 also can include one or more cache memories (not shown) that provide temporary storage of at least some program code in order to reduce the number of times program code must be retrieved from the bulk storage device 125 during execution.

The memory elements 110 can serve as physical storage for virtual memory regions which are collectively used by each running computer program process as a virtual memory space. As used herein, virtual memory is memory that appears to as a logical address space to a running computer program process. The virtual memory may be contained in the local memory 120 and/or in the bulk storage device 125.

The memory elements 110 also can serve as physical storage for allocated memory, which may be allocated as heap blocks. Such memory can be dynamically allocated during runtime of a computer program. As known to those skilled in the art, dynamic memory allocation can distribute ownership of memory resources among many pieces of data and code. The memory that is allocated need not be contiguous. The use of dynamic memory allocation is beneficial for maximizing the use of limited memory resources, but can lead to obstacles when attempting to recover allocated memory locations which are no longer being used, as previously described. The present invention addresses these issues.

Input/output (I/O) devices such as a keyboard 130, a display 135, and a pointing device (not shown) optionally can be coupled to system 100. The I/O devices can be coupled to the system 100 either directly or through intervening I/O controllers. Network adapters (not shown) also can be coupled to system 100 to enable system 100 to communicate with other systems, computer systems, remote printers, and/or remote storage devices through intervening private or public networks. Modems, cable modems, and Ethernet cards are examples of different types of network adapters that can be used with system 100.

As pictured in FIG. 1, the memory elements 110 can serve as physical storage for an instrumented computer program under test (CPUT) 140. The instrumented CPUT 140, being implemented in the form of executable program code, can be executed by the system 100 for the purposes of performing runtime analysis in accordance with the methods described herein.

The memory elements 110 also can store a runtime analysis and control module 145. To generate the instrumented CPUT 140, the runtime analysis and control module 145 can instrument the CPUT to control and change the behavior of the CPUT in useful ways. For example, instrumentation code can be added to the CPUT to automatically generate data for use in monitoring the instrumented CPUT 140. Instrumentation code also can be added to the CPUT to pause, disable and enable threads and functions within the CPUT, as well as perform other tasks, in response to an event or in response to a user request. Notably, the instrumentation code also can include functions and/or methods that identify memory allocations, memory deallocations, commitment of virtual memory regions committed for storage of heap memory blocks, and decommitment of such virtual memory regions.

Corresponding data can be communicated to the runtime analysis and control module 145, which can track the memory allocations and deallocations, as well as commitment and decommitment of virtual memory regions committed for storage of heap memory blocks.

When the CPUT 140 is executed, the runtime analysis and control module 145 also can a perform leak detection scan of the virtual memory physically stored in memory elements 110 to identify allocated memory locations which are no longer being used by the instrumented CPUT 140, but which have not been reclaimed as available memory. The leak detection scan can be performed in response to an occurrence of an event within the CPUT 140, for example a heap destroy event, pursuant to a user request, at the end of the run of the CPUT 140, or at any other suitable time.

In addition, the runtime analysis and control module 145 can perform a pre-leak detection scan. The pre-leak detection scan can be performed prior to the leak detection scan, for instance when requests are received to allocate heap blocks, but before the CPUT is made aware of the allocated heap blocks. Such requests can be generated by the CPUT 140, or an operating system on which the CPUT 140 is instantiated. For example, instrumented code within the CPUT 140 can intercept calls requesting heap block allocation, and communicate such calls to the runtime analysis and control module 145. In another embodiment, the runtime analysis and control module 145 can detect such calls for heap block allocation within the operating system. A heap block allocation request can be detected, for instance, when a standard heap memory allocation routine such as the malloc( ) routine is invoked. Standard heap memory allocation routines are well known to those skilled in the art.

The pre-leak detection scans can identify data in virtual memory that contain values which correlate to addresses of a memory locations in the virtual memory regions committed for storage of heap memory blocks. When a new heap virtual memory region has just been committed, such data are not valid memory pointers, and can be identified as non-pointer data. Accordingly, when a leak scan is later performed to detect memory pointers to locations in the virtual memory region, the non-pointer data can be ignored. In one embodiment, only non-pointer data that has not changed since the virtual memory region was committed will be ignored. That is, if the data has changed, it is possible that a valid memory pointer has been written to that location in virtual memory, so the re-written data still can be identified in the leak scan if it appears to be a valid memory pointer.

The memory elements 110 also can store a non-pointer tracking structure 150 that tracks the non-pointer data. The non-pointer tracking structure 150 can be implemented in any suitable manner. For example, the non-pointer tracking structure 150 can be implemented as a data table, a hash table, or any other suitable data file.

Within the non-pointer tracking structure 150 locations of the non-pointer data can be associated with a virtual memory region committed for storage of heap memory blocks, or the memory locations within the virtual memory region to which the non-pointer data correlates. When the leak detection scan is performed, the data contained in the non-pointer tracking structure 150 can be accessed in order to identify the memory locations of the non-pointer data so that the non-pointer data can be excluded from a list of potential memory pointers identified during the leak detection scan. In one arrangement, when data at the memory locations changes, the data associating the non-pointer data with the virtual memory region, or the memory locations within the virtual memory region, can be removed from the non-pointer tracking structure 150. Further, when the virtual memory region is decommitted, all data corresponding to the virtual memory region, or the memory locations within the virtual memory region, can be removed from the non-pointer tracking structure 150.

As used herein, "outputting" and/or "output" can mean storing in memory elements 110, for example, writing to a file stored in memory elements 110, writing to display 135 or other peripheral output device, playing audible notifications, sending or transmitting to another system, exporting, or the like.

Figure 2:
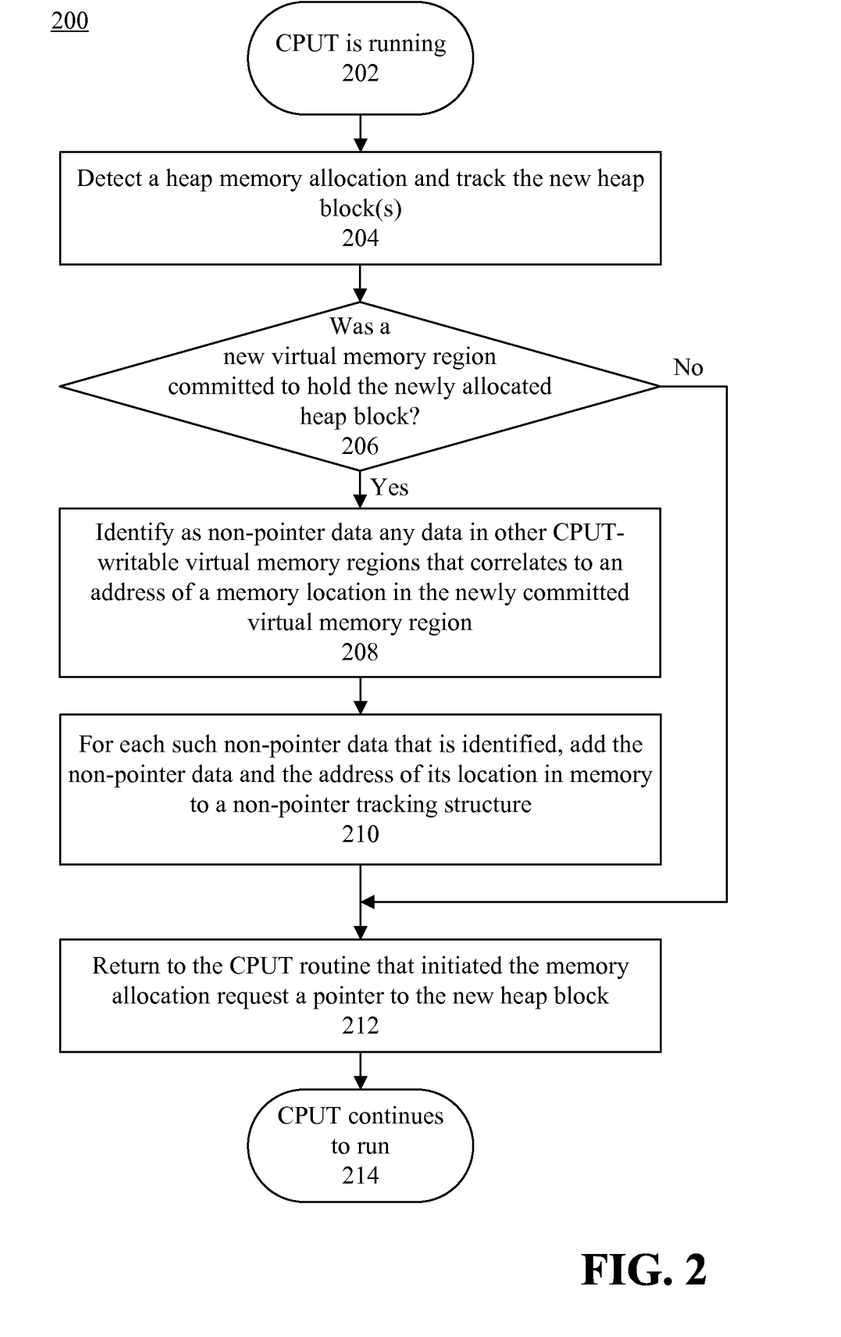
FIG. 2 is a flow chart illustrating a method of identifying non-pointer data in accordance with an embodiment of the present invention.

FIG. 2 is a flow chart illustrating a method 200 of identifying non-pointer data in accordance with an embodiment of the present invention. The method 200 can begin at step 202 in a state in which the CPUT is running. At step 204, a heap memory allocation can be detected or intercepted, and new heap blocks that are allocated can be tracked. For example, in the C or C++ programming environment, invocation of the malloc( ) library function by the CPUT can be detected or intercepted. Corresponding tracking structures that are configured to indicate heap blocks that are allocated and deallocated can be updated and/or created to indicate the heap block allocations.

Referring to decision block 206, a determination can be made as to whether a new virtual memory region was committed to hold the newly allocated heap block. If a new heap memory region was not committed, the method 200 can proceed to step 212, which will be described. If, however, a new heap memory region was committed, at step 208 any data in other CPUT-writable virtual memory regions that correlates to an address of a memory location in the newly committed virtual memory region can be identified as non-pointer data. The process implemented at step 208 can be referred to as a "pre-leak detection scan."

At step 210, for each non-pointer data item that is identified by the pre-leak detection scan, the non-pointer data item, as well as its address in the CPUT-writable virtual memory, can be added to a non-pointer tracking structure. For example, each non-pointer data item that is identified can be added to a list of non-pointers. At step 212, a pointer to the new heap block can be returned to the CPUT routine that initiated the memory allocation request. At step 214, the CPUT can continue to run.

Figure 3:
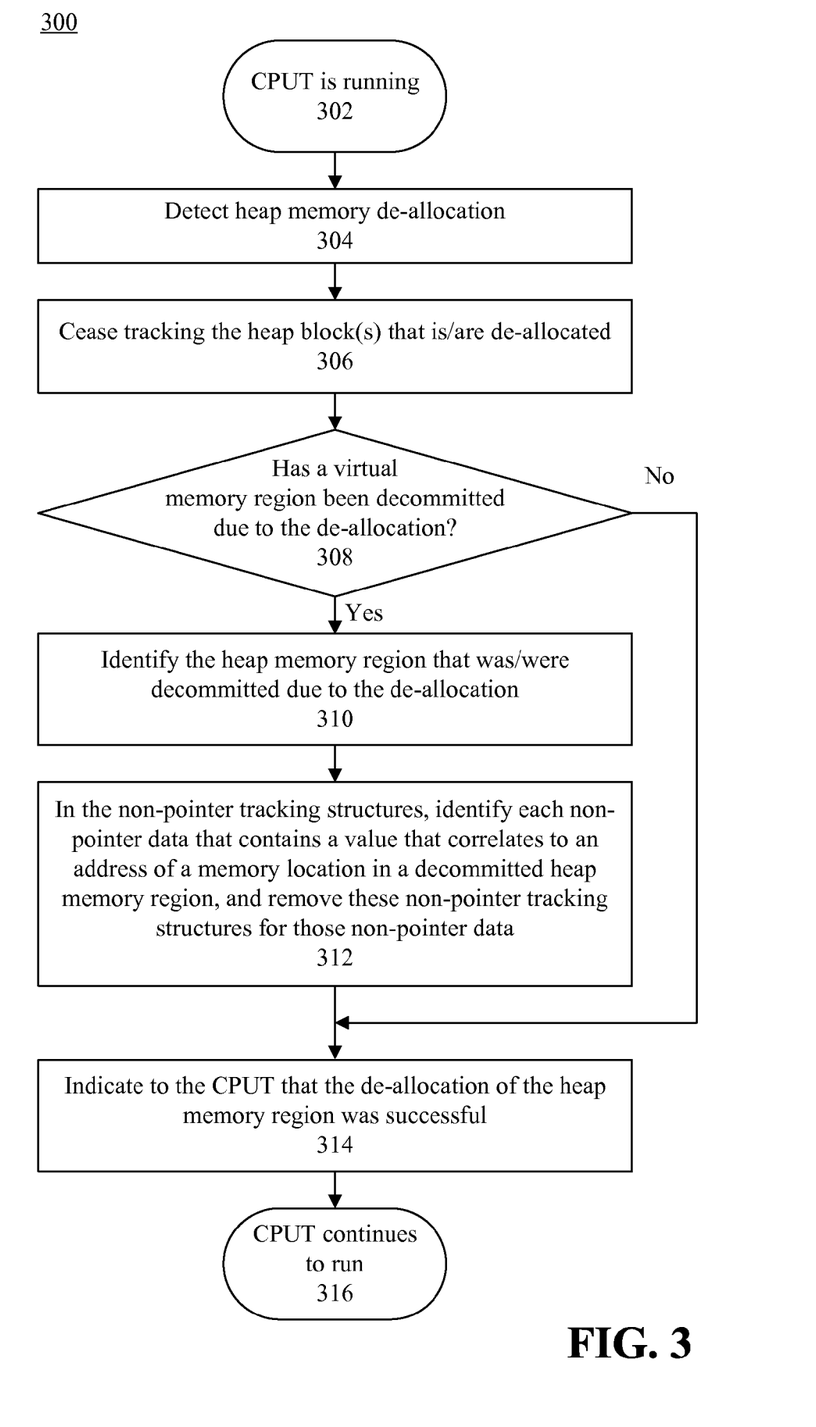
FIG. 3 is a flow chart illustrating a method of identifying non-pointer data in accordance with another embodiment of the present invention.

FIG. 3 is a flow chart illustrating a method 300 of identifying non-pointer data in accordance with another embodiment of the present invention. The method 300 can begin at step 302 in a state in which the CPUT is running. At step 304, a heap memory deallocation can be detected. For example, in the C or C++ programming environment, invocation of the free( ) library function by the CPUT can be detected. The tracking structures that are configured to track heap block allocation and deallocation can be updated to indicate that the heap block is no longer allocated. At step 306, tracking of the heap block(s) that is/are deallocated in response to the request can cease.

Referring to decision box 308, a determination can be made as to whether a virtual memory region been decommitted due to the deallocation. If a virtual memory region has not been decommitted, the method 300 can proceed to step 314, which will be described. If, however, at least one virtual memory region has been decommitted, at step 310 the heap memory region(s) that was/were decommitted due to the deallocation can be identified and tracked.

At step 312, in the non-pointer tracking structures 150, each non-pointer data item that contains a value that correlates to an address of a memory location in a decommitted memory region can be identified. These non-pointer tracking structures 150 can be deleted or removed from their corresponding data set. For example, if each non-pointer tracking structure 150 corresponds to a record in a data table, the appropriate records can be removed or deleted. At step 314, an indication can be provided to the CPUT to indicate that the deallocation of the heap memory region was successful. At step 316, the CPUT can continue to run.

Figure 4:
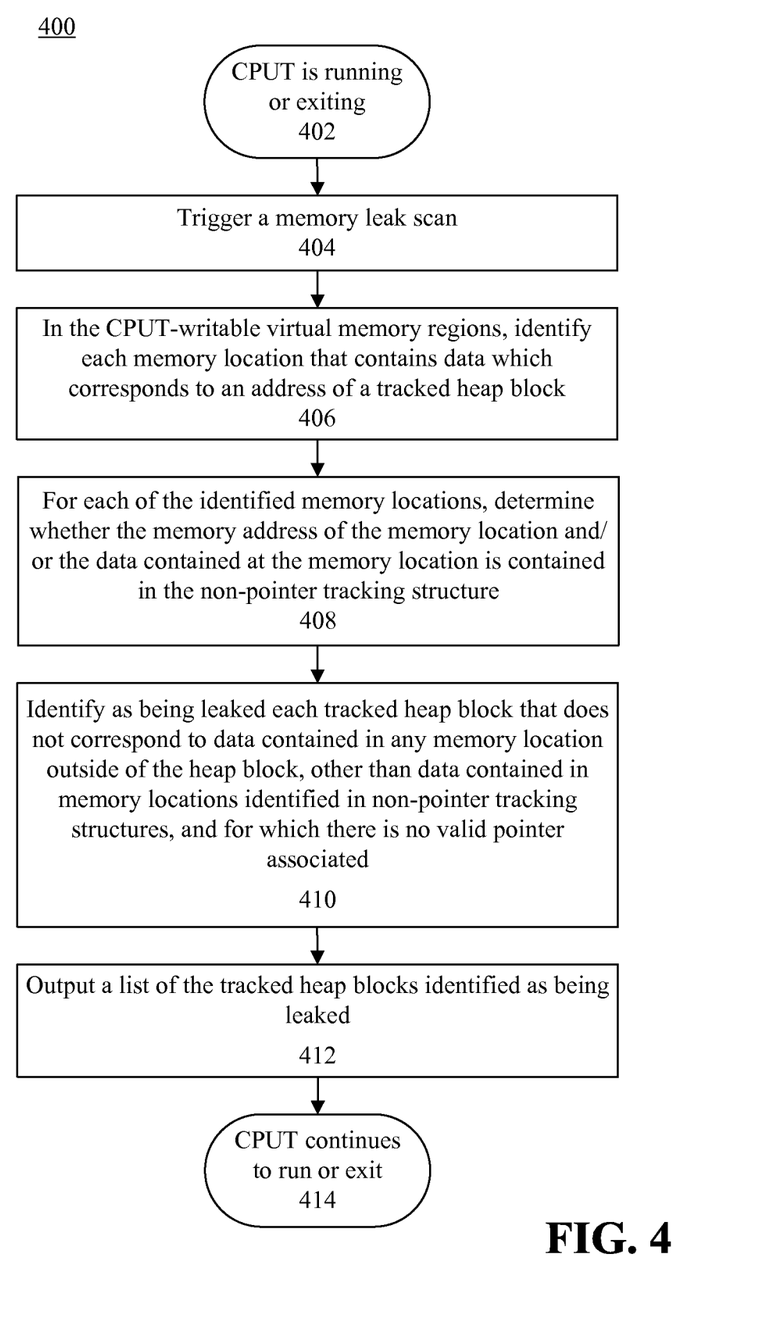
FIG. 4 is a flow chart illustrating a method of performing memory leak detection in accordance with an embodiment of the present invention.

FIG. 4 is a flow chart illustrating a method 400 of performing memory leak detection in accordance with an embodiment of the present invention. The method 400 can begin at step 402 in a state in which the CPUT is running or exiting. At step 404, a memory leak scan can be triggered. The memory leak scan can be triggered in response to the CPUT exiting, in response to a user request, in response to an automated request generated by the runtime analysis and control module, or triggered in any other suitable manner.

At step 406, in the CPUT-writable virtual memory regions, each memory location that contains data which corresponds to an address of a tracked heap block can be identified. At step 408, for each of the identified memory locations, a determination can be made as to whether the memory address of the memory location and/or the data contained at the memory location is contained in a non-pointer tracking structure 150.

At step 410 each tracked heap block that does not correspond to data contained in any memory location outside of the heap block, other than data contained in memory locations identified in non-pointer tracking structures, and for which there is no valid pointer associated, can be identified as being leaked. A valid pointer can be a data item not located within the heap block that identifies an address within the heap block. Such a valid pointer can be a data item found during the process performed at step 406, but at step 408 was not identified as being contained in the non-pointer tracking structure.

At step 412, a list of the tracked heap blocks identified as being leaked can be output. For example, the list can be output to the memory elements, the display, or output in any other suitable manner. At step 414, the CPUT can continue to run or to exit.

At this point, it should be noted that steps 406-410 can be performed using an algorithm that compares the value at each location in CPUT-writable virtual memory with the base and extent of each allocated heap block whose creation has been detected or intercepted during the run. For each value in CPUT-writable virtual memory that thus references a tracked heap block, the algorithm can search the non-pointer tracking structures 150 to determine whether there is a corresponding non-pointer tracking structure 150 and, if so, treat that location in CPUT-writable virtual memory as irrelevant to the leak detection scan. The algorithm then can repeat these steps for each memory location until all of the memory locations have been processed in this manner.

It also should be noted that those skilled in the art will appreciate that a number of other processes can be implemented in conjunction with the processes presented herein. For example, additional leak detection processes known in the art also can be performed in addition to the steps 402-414 presented in FIG. 4, and can rely upon the results generated by any such steps.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. Within a system comprising a processor and a memory, a method of detecting memory that may be reclaimed from application data objects that are no longer in use, the method comprising:
   when at least a first virtual memory region is newly committed for heap block storage, performing a pre-leak detection scan of other virtual memory regions to identify at least one non-pointer data item in the other virtual memory regions, the non-pointer data item comprising data that corresponds to an address of a memory location within the first virtual memory region, but that is not a memory pointer;
   performing a leak detection scan identifying potential memory pointers, wherein the identified non-pointer data item is excluded from the identified potential memory pointers; and
   outputting a list of leaked heap blocks, each leaked heap block exclusively comprising memory locations that do not have a corresponding potential memory pointer.

2. The method of claim 1, further comprising:
   before performing the pre-leak detection scan, detecting commitment of the first virtual memory region.

3. The method of claim 1, further comprising:
   identifying a location of the non-pointer data item within the other virtual memory regions.

4. The method of claim 3, further comprising:
   creating a non-pointer tracking structure that associates the non-pointer data item with the address of the memory location within the first virtual memory region.

5. The method of claim 4, wherein the non-pointer tracking structure creates an association between the non-pointer data and the first virtual memory region.

6. The method of claim 4, further comprising:
   when the first virtual memory region is decommitted, removing any corresponding non-pointer tracking structures from a set of non-pointer tracking structures.

7. The method of claim 1, wherein
   the list of leaked heap blocks comprises the first virtual memory region.

8. Within a system comprising a processor and a memory, a method of detecting memory that may be reclaimed from application data objects that are no longer in use, the method comprising:
   detecting allocation of a heap block triggering a first virtual memory region to be newly committed;
   performing a pre-leak detection scan of other virtual memory regions to identify at least one non-pointer data item in the other virtual memory regions, the non-pointer data item comprising data that corresponds to an address of a memory location within the first virtual memory region, but that is not a memory pointer;
   performing a leak detection scan comprising:
      determining whether the non-pointer data has changed since the first virtual memory region was committed; and
      identifying potential memory pointers, wherein the identified non-pointer data item is excluded from the identified potential memory pointers when the non-pointer data has changed since the first virtual memory region was committed; and
      outputting a list of leaked heap blocks, each leaked heap block exclusively comprising memory locations that do not have a corresponding potential memory pointer.

9. The method of claim 8, further comprising:
   identifying a location of the non-pointer data item within the other virtual memory regions.

10. The method of claim 8, further comprising:
    creating a non-pointer tracking structure that associates the non-pointer data item with the address of the memory location within the first virtual memory region.

11. The method of claim 10, further comprising:
    detecting deallocation of a heap block triggering the first virtual memory region to be decommitted, and
    removing any corresponding non-pointer tracking structures from a set of non-pointer tracking structures.

12. The method of claim 10, further comprising:
    via the non-pointer tracking structure, creating an association between the non-pointer data and the first virtual memory region.

13. The method of claim 8, wherein
    the list of leaked heap blocks comprises the first virtual memory region.

14. A computer program product comprising
    a computer-usable storage device having stored therein computer-usable program code for reclaiming memory from application data objects that are no longer in use,
    the computer-usable program code, which when executed by a computer hardware system, causes the computer hardware system to perform:
       performing a pre-leak detection scan when a first virtual memory region is newly committed to identify at least one non-pointer data item in other virtual memory regions that correlates to an address of a memory location in the first heap memory region holding a newly allocated heap block;

when at least a first virtual memory region is committed for heap block storage, performing a pre-leak detection scan of other virtual memory regions to identify at least one non-pointer data item in the other virtual memory regions, the non-pointer data item comprising data that corresponds to an address of a memory location within the first virtual memory region, but that is not a memory pointer;

performing a leak detection scan identifying potential memory pointers, wherein the identified non-pointer data item is excluded from the identified potential memory pointers; and outputting a list of leaked heap blocks, each leaked heap block exclusively comprising memory locations that do not have a corresponding potential memory pointer, wherein the computer-usable storage device does not consist of a transitory, propagating signal.

15. The computer program product of claim 14, wherein the computer-usable program code further causes the computer hardware system to perform:

before performing the pre-leak detection scan, detecting allocation of a heap block triggering the first virtual memory region to be committed.

16. The computer program product of claim 14, wherein the computer-usable program code further causes the computer hardware system to perform:

identifying a location of the non-pointer data item within the other virtual memory regions.

17. The computer program product of claim 16, wherein the computer-usable program code further causes the computer hardware system to perform:

creating a non-pointer tracking structure that associates the non-pointer data item with the address of the memory location within the first virtual memory region.

18. The computer program product of claim 17, wherein the non-pointer tracking structure creates an association between the non-pointer data and the first virtual memory region.

19. The computer program product of claim 17, wherein the computer-usable program code further causes the computer hardware system to perform:

removing, upon the first virtual memory region being decommitted, the non-pointer tracking structure from a set of non-pointer tracking structures.

20. The computer program product of claim 19, wherein the list of leaked heap blocks comprises the first virtual memory region.

\* \* \* \* \*